July 2, 1963
D. A. RICHINS
3,096,505
BRAKELIGHT SYSTEM
Filed May 25, 1962
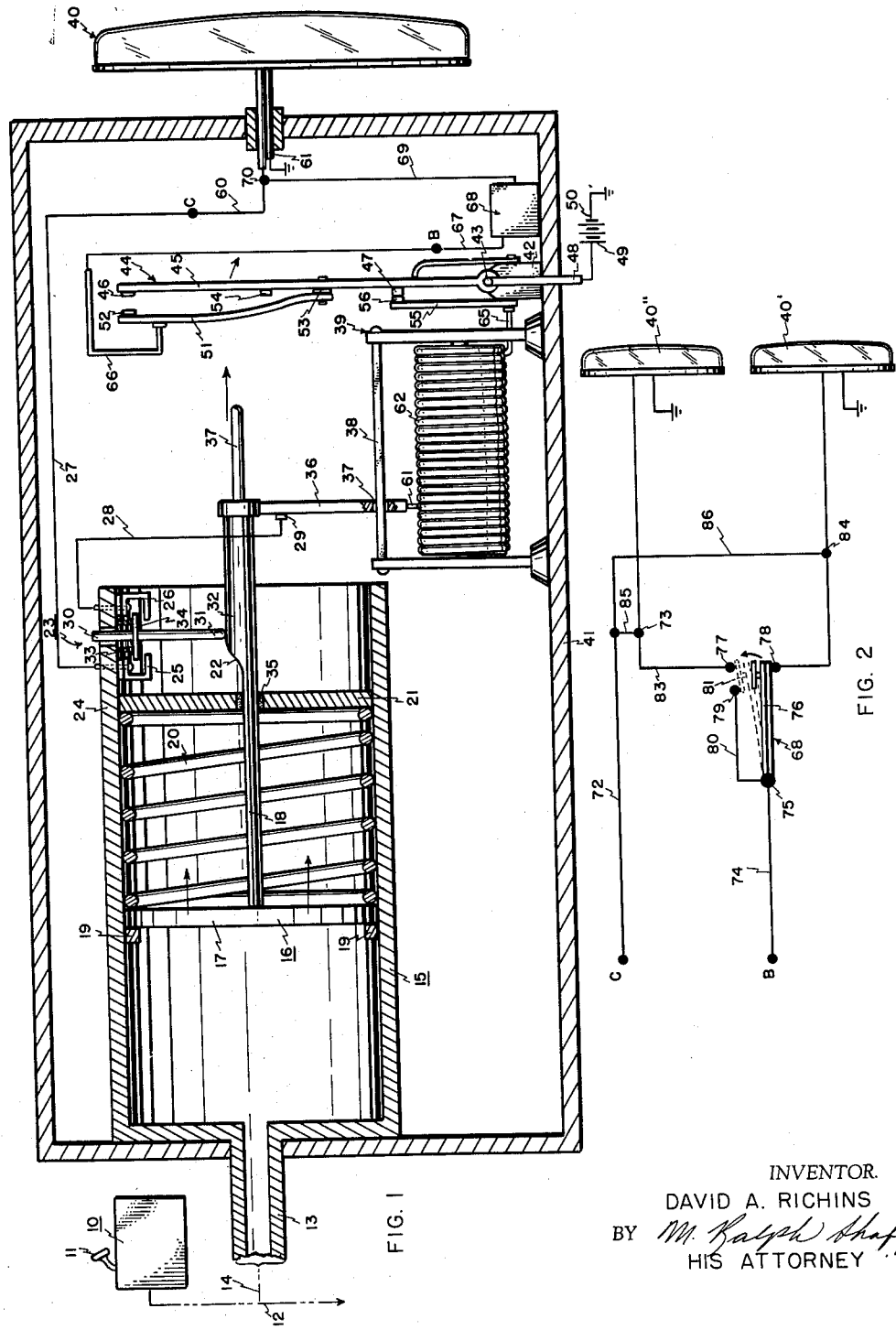
INVENTOR.
DAVID A. RICHINS
BY M. Ralph Shaffer
HIS ATTORNEY

United States Patent Office 3,096,505
Patented July 2, 1963

3,096,505
BRAKELIGHT SYSTEM
David A. Richins, Echo, Utah
Filed May 25, 1962, Ser. No. 197,783
2 Claims. (Cl. 340—69)

The present invention relates to brakelight systems and, more particularly, to a new and improved brake-lighting system which is adapted for use with fluid (air or liquid) operated brakes such as air-brakes and hydraulic brakes.

In contrast with prior attempts to relate brakelight intensity to braking action, the present invention, rather than being mechanically linked to brake pedal movement, is made responsive to the fluid pressure produced by braking action so that the degree thereof is accurately reflected in the intensity of the brake lights of the vehicle incorporated in the system. In this manner serious indication errors, as would otherwise be the case for low-fluid level of the master cylinder or otherwise produced, excessive brake pedal travel prior to brake set, are avoided.

Accordingly, an object of the present invention is to provide a new and improved brakelight system wherein the intensity and/or character of brakelight display is directly related to and in fact actuated by the fluid pressure experienced by the brakes of the vehicle incorporated in the present system.

A further object of the present invention is to provide an electro-mechanical system responsive to increases in fluid pressure at the brake lines of a conventional fluid braking system for actuating electro-mechanically desired electrical components so that the character of current supply to the brakelights of the vehicle may be progressively and desirably altered.

A further object of the present invention is to provide a new and improved, automatic switching system in connection with pressure cylinder plunger used so that the latter, upon translation due to increased pressure within the pressure cylinder, will automatically cut in desired electrical components such as brakelights.

A further object of the present invention is to provide a new and improved, fluid operated brakelight system which is reliable, extremely versatile in use, and inexpensive to manufacture.

A further object of the present invention is to provide a fluid operated brakelight system which is responsive to brake pressure at the wheels for giving a desired indication of the degree of braking applied, thereby warning drivers to the rear of the vehicle being braked as to the manner and degree of the braking action thereof.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a vertical section, largely in schematic form, of the apparatus which may be used with a conventional fluid braking system to accomplish the purposes intended by the invention.

FIGURE 2 is a schematic diagram of a substitute portion of the circuit shown in FIGURE 1.

In FIGURE 1 is illustrated in schematic form an automobile fluid (hydraulic or air, for example) braking system 10, for example, having a brake pedal actuator 11 which, upon depression thereof, increases the fluid pressure of the fluid in line 12 leading to the brakes of the vehicle. An auxiliary fluid outlet 13 is coupled from line 12 by means of line 14; accordingly, upon depression of brake pedal 11, the fluid pressure will increase not only at brake line 12 but also at auxiliary line 14 leading to auxiliary fluid outlet 13. The latter is fixedly secured or otherwise made integral with a pressure cylinder 15 into which hydraulic fluid under actuated pressure flows. Pressure cylinder 15 is supplied with a plunger 16 which may be of any conventional form and, in the embodiment shown, includes a head 17 and a stem 18. Stops 19 are disposed within and fixedly secured to pressure cylinder 15 and limit the outward travel of plunger 16 under the spring pressure of compression spring 20. Compression 20 will be seated against sealing abutment 21 of pressure cylinder 15.

The stem 18 is supplied with a cam surface 22 which, in the embodiment shown, is shown as a detent or relieved area. A protuberance could equally serve as well as will be seen hereinafter. Switch means 23 is mounted to the cylinder wall 24 of pressure cylinder 15, as shown, and includes contacts 25 and 26 which are secured in place as shown and are respectfully coupled by electrical leads 27 and 28 to terminal C and to contact 29, respectively. The electrical circuit involved will be considered hereinafter. Switch means 23 includes a plunger 30 having a cam finger 31 which rides upon the stem 18 and, when the latter is translated in the direction to the right of the viewer, upon relieved cam surface 22. Protuberance or enlarged area 32 depresses plunger 30 against compression spring 33 so that the shorting bar 34 of plunger 30 remains out of contact with the two contacts 25 and 26. When, however, the plunger 16 is caused to move to the right under the influence of increased fluid pressure within the pressure cylinder 15, then cam finger 31 will ride down cam surface 22 so as to permit the closing of switch means 23.

Enlarged portion or protuberance 32 may be considered to be a portion of the cam surface 22 and, in any event, operates to retain the switch 23 in open condition when fluid pressure within the pressure cylinder 15 are minimal or non-existent (as is the case, for example, when the pedal is not being actuated).

If needed, plunger 16 may be provided with a fluid seal by conventional packing means 35 in any event, plunger 16 includes a lateral arm 36 and a preferably included, rearwardly extending finger 37. Arm 36 is supplied with an aperture 37 for receiving guide bar 38 of rheostat 39.

While a rheostat 39 is illustrated, it is obvious that other electrical techniques may be incorporated in lieu thereof, such as a voltage divider or other means, for varying, in accordance with the depression of plunger 16, the electrical current supplies to brakelight means 40. Again, the operation of the electrical circuit will be hereinafter described.

A housing 41 of any convenient form, encases the structure of the present invention. Mounted thereto is an insulative base 42 to which is hinged, by hinge pin 43, a switch 44. Switch arm 45 is conveniently, electrically conductive and includes contacts 46 and 47, is hinged to insulative base 42 by conductive pin 43 which is electrically connected by lead 48 to battery 49. The remaining side of the battery is grounded at 50 as shown. Switch 44 also includes a leaf 51 having contact 52 which is normally open or disconnected with respect to contact 46. Leaf 51 is secured by insulative mount 53 to arm 45 but is electrically non-conductive with respect thereto except for those conditions present wherein contacts 52 and 46 are in engagement. Protuberance 54 may simply serve as a fulcrum point for the resilient, springy arm 51.

Fixedly secured to insulative base 42 is a switch arm 55 having contact 56 normally in engagement with contact 47. Contacts 46 and 47, being integral with or otherwise affixed to the arm 45, are in electrically conductive relationship therewith. A mechanical spring 57 is mounted to insulative base 42 and, by its finger 58 engages the arm 45, pivoting the same about pin 43 so as to insure the electrical contact of contacts 56 and 47 in the absence of pressure exerted by finger 37 upon the over-all switch 44.

The operation of the circuit as thus far described is as follows. In the absence of the application of brake pressure (or the existence of very slight brake pressure), then there will be no depression of plunger 16. As a consequence, switch means 23 will be open so that brakelight 40 will not be conducting electrical current. However, an increase in fluid pressure within pressure cylinder 15 will depress plunger 16 somewhat so that cam finger 31 will slide down the cam surface 22, thereby permitting switch means 23 to close. It is noted that lead 60 connects terminal C to one side of brakelight means 40; the remaining side of brakelight means 40 is connected by lead 61 to ground. Hence, a buildup in pressure within cylinder 15 (owing to a slight depression of brake pedal 11), will depress plunger 16 within pressure cylinder 15 so that, in addition to switch means 23 becoming closed in manner as hereinbefore described, the sliding contact 61 of rheostat 39, which contact slides along rheostat coil 62 in a conventional manner, reduces the number of turns of the coil between battery 49 and brakelight means 40 so as to reduce the electrical resistance offered to the circuit by rheostat 39. Upon further progressive depression of the plunger 16, less and less electrical resistance is offered by rheostat resistance coil 62 to the circuit so that the brakelight means 40 will become increasingly brighter, conducting as it does increased current. It is to be observed that the circuit is completed through the light 40, leads 60 and 27, switch means 23, electrically conductive arm 36 and contact 61, rheostat coil 62 and lead 65, arm 55, through contacts 56 and 47 back to the other side of battery 49. It will be noted that the contacts 56 and 47 remain closed provided finger 37 has not advanced sufficiently to the right so as to produce the engagement of contacts 52 and 46 and the disengagement of contacts 56 and 47. However, at its extremity of travel the plunger 16 will advance to the farthermost or extremity regions of its movement to the right so that finger 37 will in fact come into engagement with switch 44 so as to produce contact between electrical contacts 52 and 46 and the disengagement of contacts 56 and 47 against the action of spring 57.

The remaining portion of the circuit will now be discussed. Contact 46 is connected through switch arm 45 and pin 43 to battery 49. Electrical lead 66 is electrically connected to leaf 51 in a conventional manner and leads to terminal B. Remaining lead 67 connects to circuit breaker (or "flasher") 68 the opposite side of which is connected by lead 69 to junction 70. Junction 70 is electrically connected to the remaining side of brakelight means 40.

Thus, in operation the translation of finger 37 to the right, so as to produce the engagement of contacts 52 and 46 and the disengagement of contacts 56 and 47, interrupts the former circuit as before explained by removing battery voltage of battery 49 from lead 65. However, an additional portion of the circuit comes now into operation by virtue of the engagement of contacts of 52 and 46 and the conduction therethrough of battery voltage through lead 66, 67, circuit breaker 68, lead 69, junction 70 to the brakelight means 40. As to unit 68, the same is referred to as a circuit breaker or "flasher" in the industry. It will normally comprise a bi-metallic strip, as illustrated in FIGURE 2, or other suitable means. In any event, what is had now is an interruption of the rheostat circuit 62 and an almost simultaneous energization of the circuit breaker or flasher 68 which leads to brakelight means 40. Unit 68 serves to supply intermittent electrical current surges to the brakelight means 40 so that the latter will flash off and on. FIGURE 1 illustrates the situation wherein a single brakelight is employed. Of course, there may be one or more brakelights employed.

Where there are two employed, for example, then the circuit of FIGURE 2 will obtain.

In FIGURE 2 terminals C and B are the same as those in FIGURE 1; however, in lieu of that portion of the circuit shown to the right of these terminals in FIGURE 1, it will be seen in FIGURE 2 that terminal C is now connected by electrical lead 72 to junction 73. Correspondingly, electrical lead 74 interconnects terminal B and flasher contact 75. Flasher arm 76 is, as before explained, a bi-metallic strip which oscillates in a conventional manner between two contacts 77 and 78. When the bi-metallic strip 76 conducts current it becomes hot and, due to its bi-metallic nature, bends so as to contact the terminals 77 and 79. Electrical lead 80 is a low resistance lead so that it will carry almost all of the current to contact 79 and through shorting bar 81 of arm 76 to contact 77 while the bi-metallic strip 76 is cooling. When the bi-metallic strip 76 is cooled sufficiently then it will fall back to make conduction again with contact 78. Electrical lead 82 interconnects contact 78 with brakelight 40′ the remaining side of which is grounded. Electrical lead 83 interconnects contact 77 with brakelight 40″. Lead 72 is interconnected with junctions 73 and 84 by means of leads 85 and 86. Thus, it will be seen with reference to FIGURES 1 and 2 that either the rheostat coil 62 is directly coupled to junction C (and hence junction 70) or the flasher unit 68 is coupled to the same. Hence, during extremities of travel the rheostat operation becomes ineffective electrically and the flasher unit takes over. In the case of FIGURE 2 the lights 40′ and 40″ will flash alternately, owing to the operation of flasher unit 68 as hereinbefore described.

Of course, if desired, the rheostat could conceivably be kept in the circuit while the flasher is operating so that the lights would be flashing at a very high intensity. However, this increases battery drain; further, rapidly flashing brakelights will be of sufficient distinction to attract attention of automobiles to the rear even though the brightness thereof is not excessive.

Thus, what is obtained is an important addition to a fluid operated braking system wherein increased foot pedal pressure and, hence, increased braking action at the wheels of the vehicle will automatically produce increasing brake light intensity which increases preferably proportionately to the increase in brake pressure so that vehicles to the rear will be apprised of the manner of braking which the automobile is undergoing. For extreme braking action then the plunger 16 operates at its extremity of travel so that the switch 44 is actuated, thereby insuring that the brake light means 40 is flashing so as to further attract the attention of drivers to the rear.

It is to be understood that there is no desire for limitation to the exact details of construction shown and described, for obvious modifications will occur to a person skilled in the art.

I claim:

1. In a fluid braking system having an auxiliary fluid outlet providing variable fluid pressure in accordance with the braking actuation of said system, the combination of a pressure chamber coupled to said auxiliary fluid outlet, a spring loaded plunger operatively disposed within said pressure chamber, brakelight means, electrical circuit means coupled to said brakelight means for selectively supplying electrical current to said brakelight means, said electrical circuit means including actuatable means for selectively varying the electrical current supplied to said brakelight means in accordance with the actuation of said actuatable means, said plunger having means for engaging said actuatable means for varying the condition thereof in accordance with the movement of said plunger so as to effect such variation of electrical current to said brakelight means, and wherein said electrical circuit means is additionally provided with circuit means responsive to extremity movement of said plunger for automatically supplying intermittent electrical current surges to said brakelight means.

2. In a fluid braking system having an auxiliary fluid outlet providing variable fluid pressure in accordance with the braking actuation of said system, the combination of a pressure chamber coupled to said auxiliary fluid outlet, a spring loaded plunger operatively disposed within said pressure chamber, brakelight means, electrical circuit means coupled to said brakelight means for selectively supplying electrical current to said brakelight means, said electrical circuit means including actuatable means for selectively varying the electrical current supplied to said brakelight means in accordance with the actuation of said actuatable means, said plunger having means for engaging said actuatable means for varying the condition thereof in accordance with the movement of said plunger so as to effect such variation of electrical current to said brakelight means, and wherein said electrical circuit means is additionally provided with circuit means responsive to extremity movement of said plunger for automatically supplying intermittent electrical current surges to said brakelight means and for automatically electrically disconnecting said actuatable means from said brakelight means.

References Cited in the file of this patent
UNITED STATES PATENTS

| | | |
|---|---|---|
| 2,706,809 | Hollins | Apr. 19, 1955 |
| 2,891,234 | Hague | June 16, 1959 |
| 2,924,817 | Dawkins et al. | Feb. 9, 1960 |